Dec. 15, 1964 R. R. WAREHAM 3,161,118
PHOTOGRAPHIC FILM ASSEMBLAGE
Original Filed Feb. 14, 1958 3 Sheets-Sheet 1

INVENTOR.
Richard R. Wareham
BY
Brown and Mikulka
and
Robert E. Corb
Attorneys

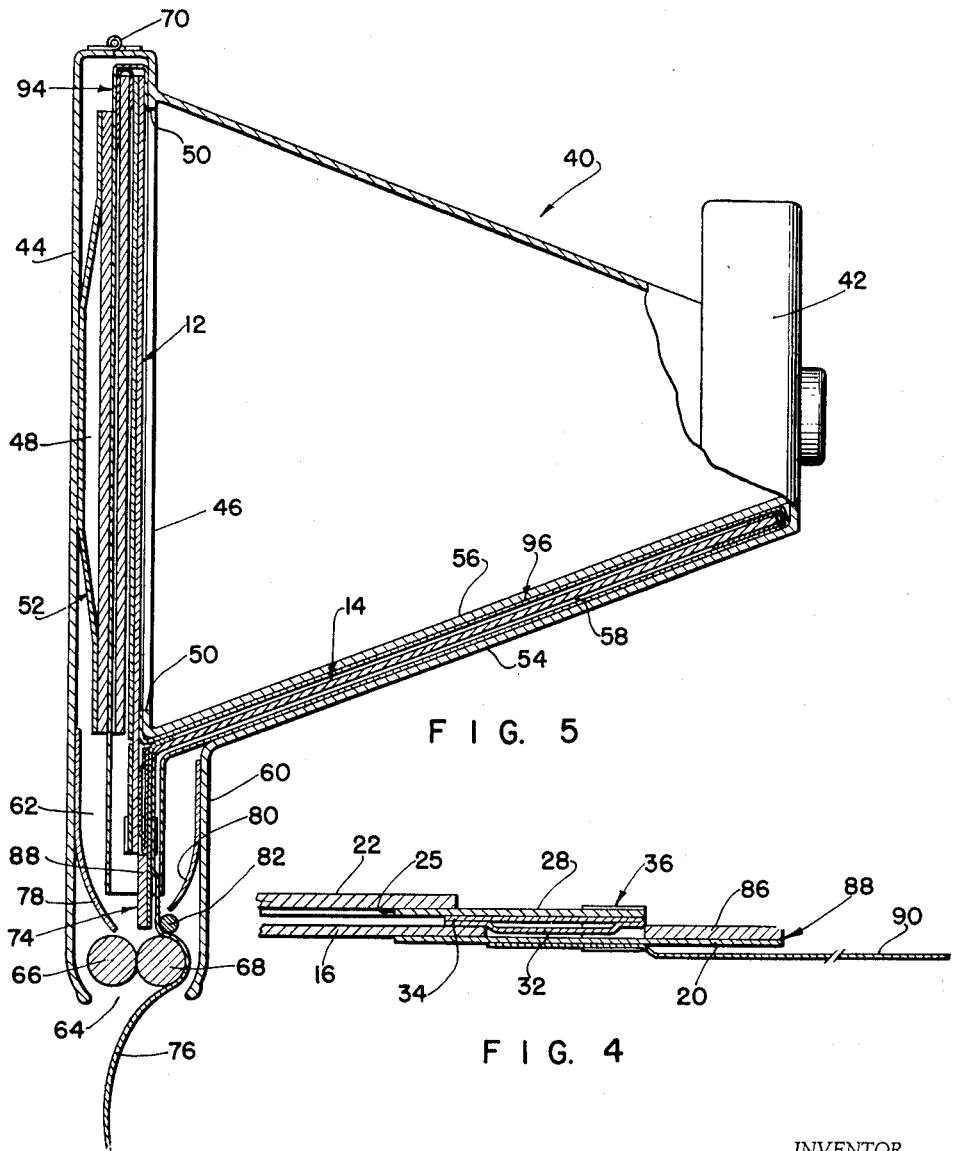

Dec. 15, 1964   R. R. WAREHAM   3,161,118
PHOTOGRAPHIC FILM ASSEMBLAGE
Original Filed Feb. 14, 1958   3 Sheets-Sheet 3
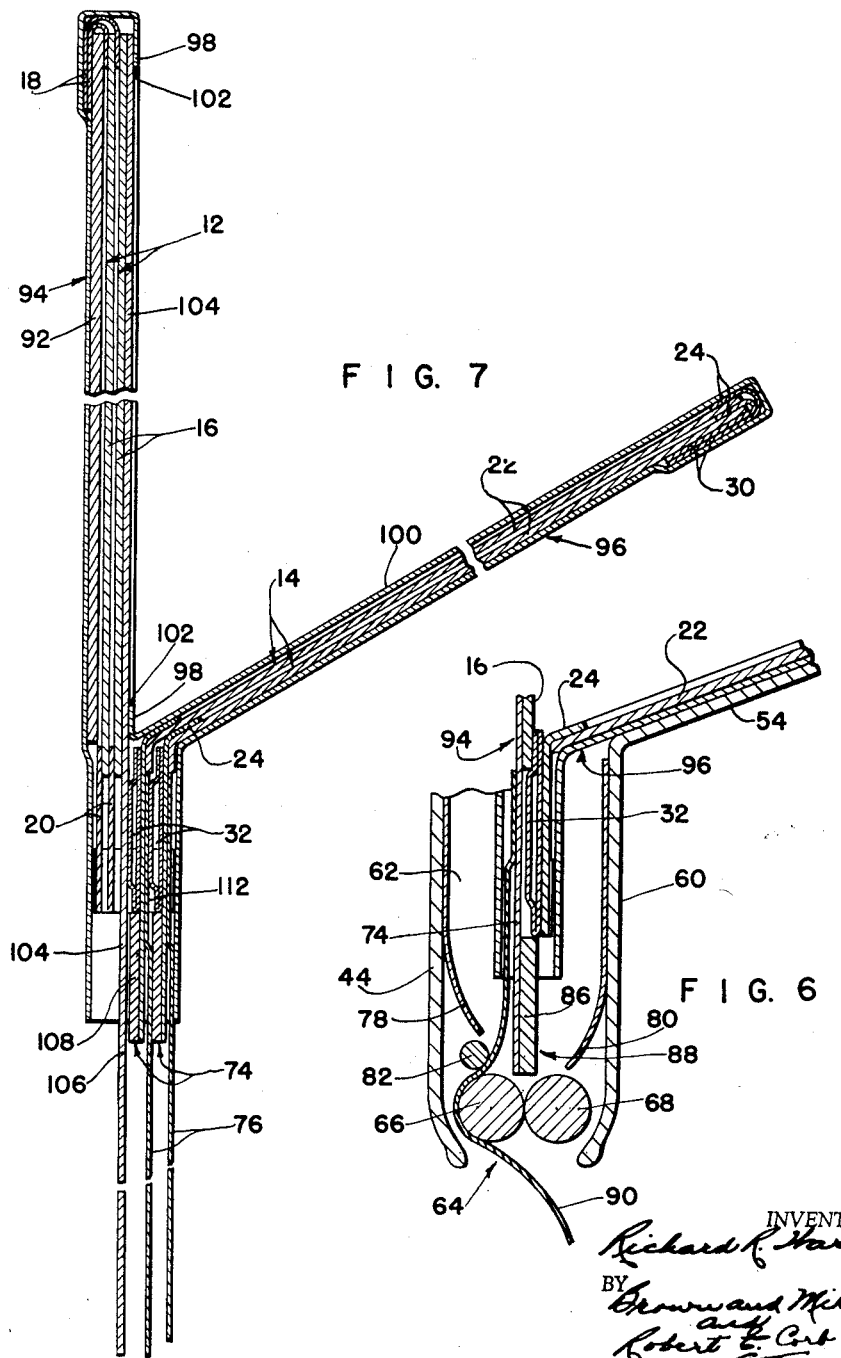
INVENTOR
Richard R. Wareham
BY
Brown and Mikulka
and
Robert E. Cort
Attorneys

United States Patent Office 3,161,118
Patented Dec. 15, 1964

3,161,118
PHOTOGRAPHIC FILM ASSEMBLAGE
Richard R. Wareham, Marblehead, Mass., assignor to Polaroid Corporation, Cambridge, Mass., a corporation of Delaware
Original application Feb. 14, 1958, Ser. No. 715,370, now Patent No. 3,079,849, dated Mar. 5, 1963. Divided and this application Mar. 4, 1963, Ser. No. 262,752
12 Claims. (Cl. 95—19)

This invention relates to photographic products and particularly to novel and improved photographic film assemblages.

This application is a division of the copending application of Richard R. Wareham, Serial No. 715,370, filed February 14, 1958, now Patent No. 3,079,849, issued March 5, 1963, in which there is described a new and improved method of feeding and withdrawing photographic film units in succession from photographic apparatus such as a camera between a pair of juxtaposed pressure-applying members which distribute a processing liquid within each film unit. This method solves the problem of withdrawing a succession of unconnected film units from an assemblage of film units between a pair of pressure-applying members; and has the advantage of permitting a plurality of leaders, attached to a plurality of individual film units, to project from a camera where each leader may be grasped for withdrawing a film unit between the pressure-applying members without the leaders extending between the pressure-applying members where they would interfere with the distribution of the processing liquid within the film unit being withdrawn. In the method described, the leaders attached to the film units extend from the camera past and to one side of both pressure-applying members to permit the leaders to be engaged, one at a time, for drawing the leading ends of the film units between the pressure-applying members to an extent permitting the leading end of each film unit to be engaged for withdrawing the film unit from the camera between the pressure-applying members.

An object of the invention is to provide a novel and improved photographic film assemblage comprising a plurality of individual film units constructed and arranged for use in the method described.

Another object of the invention is to provide a photographic film assemblage of the type described including a container and a plurality of individual film units in said container, each comprising means including a first leader joining the photosensitive and second sheets and a second leader attached to the first leader and extending from the container for projecting from a camera past and to one side of a pair of juxtaposed pressure-applying members.

A further object of the invention is to provide a film assemblage as described in which the leader of each film unit, provided for drawing the leading end of the film unit between a pair of pressure-applying members, is designed to become detached from the film unit in a predetermined manner and at predetermined location in response to movement of the leading end of the film unit between the pressure-applying members.

Other objects of the invention will in part be obvious and will in part appear hereinafter.

The invention accordingly comprises the product possessing the features, properties and the relation of components which are exemplified in the following detailed disclosure, and the scope of the application of which will be indicated in the claims.

For a fuller understanding of the nature and objects of the invention, reference should be had to the following detailed description taken in connection with the accompanying drawings wherein:

FIG. 4 is a fragmentary, sectional view of the film unit of FIG. 3;

FIG. 5 is an elevational view partially in section of photographic apparatus in the form of a camera illustrating the manner in which the film assemblage of the invention is employed;

FIG. 6 is a fragmentary sectional view of a portion of the camera of FIG. 5 showing another embodiment thereof; and FIG. 7 is a sectional view of a film assemblage embodying the invention, the section being taken substantially midway between the sides of the assemblage.

The present invention finds utility and is embodied in a film pack or assemblage of individual film units adapted to be exposed and processed in succession by withdrawal between a pair of juxtaposed pressure-applying members. The film pack comprises a plurality of film units, each including a photosensitive sheet which is exposed within the assemblage, a second or print-receiving sheet arranged to be superposed with the exposed photosensitive sheet during processing and a rupturable container of a processing fluid. Processing of the succession of film units is effected in the camera in which the film units are exposed by a pair of juxtaposed pressure-applying members, such as rolls, which engage each film unit as it is withdrawn from the apparatus and distribute a processing fluid from the container in a layer between the photosensitive and print-receiving sheets. Each film unit comprises means including a first leader for connecting the photosensitive and second sheets and moving the sheets in superposition between the pressure-applying members from the apparatus.

As previously noted with reference to the above-identified application, the film pack of the invention is designed to be employed in apparatus in such a way that all of the leaders attached to the film units are allowed to project from the apparatus so that the leaders may be engaged in succession for withdrawing successive film units from the apparatus between the pressure-applying members. Since it is obviously undesirable to have the leader of one film unit extend between the pressure-applying members while another film unit is being drawn between the pressure-applying members to effect the distribution of a processing fluid within the other film unit, the leaders of the film units extend around and to one side of the pressure-applying members rather than between the pressure-applying members. Each of these leaders, termed a second leader, is coupled with the first leader connected to the photosensitive and second sheets of the film units at a location spaced from the leading end of first leader, and provides means for advancing the first leader between the pressure-applying members from the apparatus to an extent which makes it possible to engage the first leader for drawing the film unit between the pressure-applying members from the apparatus. The processing of each film unit is thus achieved by exposure of the photosensitive sheet of that film unit, and grasping and pulling the second leader from the apparatus to advance the first leader between the pressure-applying members from the apparatus where it may be engaged for pulling the film unit between the pressure-applying members. The second leader is designed to become detached from the first leader at its point of attachment so that the second leader will not interfere with distribution of the processing liquid.

Figure 1:
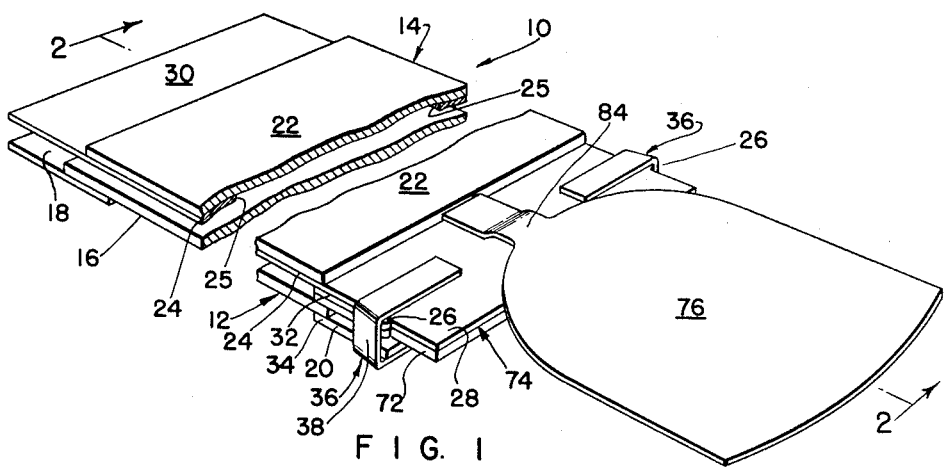
FIGURE 1 is a perspective view, partially in section, of a film unit comprising an element of the film assemblage of the invention.
Figure 2:
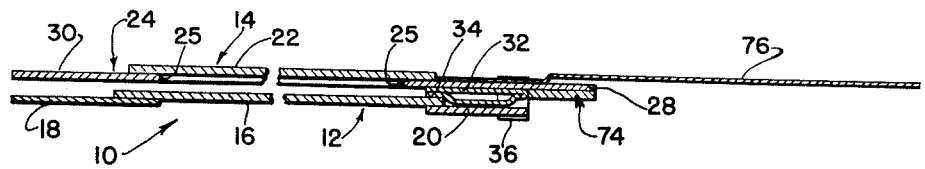
FIG. 2 is a sectional view taken along the line 2—2 of FIGURE 1.

The present invention is embodied in an assemblage of individual film units such as shown in FIG. 7. The individual film units may take a variety of forms one of which is shown in FIGS. 1 and 2 wherein the thicknesses of the materials comprising the film units are exaggerated for the purposes of clarity of illustration. The film unit designated 10 comprises a photosensitive element 12 and a second or print-receiving element 14. Both of photosensitive and second elements are in the form of sheets with photosensitive element 12 comprising a photosensitive sheet 16 and a trailer sheet 18 secured to the trailing end of the photosensitive sheet. Photosensitive sheet 16 comprises a layer of photosensitive material, preferably containing a photosensitive heavy metal salt such as silver halide, carried on a suitable support such as paper or one of the organic plastic materials commonly used for film base and including cellulose acetate and the like. Trailer sheet 18 comprises a thin sheet material such as paper which is preferably substantially thinner than the overall thickness of photosensitive sheet 16. Photosensitive element 12 is provided with a relatively short leader sheet 20 secured at the leading end of the photosensitive sheet and having edge portions extending laterally slightly beyond the lateral edges of the photosensitive sheet. These last-mentioned lateral edge portions, designated 21, of leader sheet 20 are preferably provided with lateral edges which taper or converge slightly toward the trailing end of the photosensitive sheet.

Second or print-receiving element 14 comprises a second or print-receiving sheet 22, similar in shape to the photosensitive sheet and at least coextensive with the area or exposure frame thereof which is to be exposed. In the preferred form shown, second sheet 22 is of the same width as, and slightly shorter than, photosensitive sheet 16. Print-receiving sheet 22 is mounted on a leader or carrier sheet 24 which, like trailer sheet 18 and leader sheet 20, is formed of a thin sheet material such as paper which is comparatively thin yet strong. The print-receiving sheet is mounted on the side of the carrier sheet opposite the side thereof which is intended to be superposed with the photosensitive element and at a position intermediate the ends of the carrier sheet. Carrier sheet 24 is provided with an aperture 25, preferably rectangular overlying print-receiving sheet 22 and defining the area thereof in contact with which a fluid processing agent is spread and in which a transfer print is formed. Second sheet 22 preferably comprises an image-receiving layer carried on a suitable support. The support may be of any suitable sheet material such as paper and organic plastic materials used for photographic films and prints, the choice of material depending on the manner in which the print is to be viewed, that is, by reflected or by transmitted light. The image-receiving layer comprises a material layer formed on the support or as a stratum of the support for receiving and/or supporting the transfer image formed of a material produced as a result of development of a latent image in the photosensitive sheet. Carrier sheet 24 is also provided with a pair of lateral flanges 26 similar to lateral portions 21 of leader sheet 20 and located adjacent the leading edge of second sheet 22. Carrier sheet 24 includes a leading end section 28 which is preferably slightly longer than leader sheet 20 and a trailing end section 30 which, in the form shown, is substantially equal in length to trailer sheet 18.

The photosensitive element, following exposure, is adapted to be superposed with a print-receiving element and the two elements moved in superposition between a pair of pressure-applying members for spreading a fluid processing agent in a thin layer between the photosensitive and print-receiving sheets of the two elements. In the form shown in the drawings, the fluid processing agent is provided in a rupturable container 32 attached to leading end section 28 of carrier sheet 24 on the side thereof opposite second sheet 22 between the superposed elements adjacent the leading edge of the second sheet. Container 32 is preferably formed of an elongated rectangular blank of a multilayer sheet material which is impervious to air and the fluid processing agent. The blank is folded longitudinally upon itself and the end and longitudinal margins are sealed to one another to form a cavity in which a predetermined quantity of processing agent is contained. The longitudinal edge seal of the container is designated 34 and is weaker than the two end seals so that the application of compressive pressure to the walls of the container will cause rupture of the longitudinal seal and the unidirectional discharge of the fluid contents of the container. Container 32 is mounted on leading end section 28 of carrier sheet 24 with longitudinal sealed portion 34 extending transversely of the carrier sheet and located adjacent the leading edge of aperture 25 and print-receiving sheet 22 so that the application of compressive pressure to the container through leading end section 28 and leader sheet 20 will cause the discharge of the contents of the container in the direction of the area of sheets 16 and 22 between which said fluid is to be spread. For best results, the fluid-carrying cavity of the container should be substantially equal in length to the width of aperture 25 so that the fluid contents of the container will be released therefrom in an elongated mass extending substantially from side to side of the aperture.

The film unit, in one form, may comprise materials for effecting the formation of a positive print by a silver-transfer reversal process, the photosensitive sheet comprising a silver halide emulsion and the fluid processing agent including a silver halide developer and a silver halide solvent. Processes of this type and materials useful therein for producing transfer prints directly from exposed photosensitive materials are well known in the art and are described in United States Patents Nos. 2,543,181, issued February 27, 1951, 2,661,293, issued December 1, 1953 and 2,662,822, issued December 15, 1953, all in the name of Edwin H. Land. As previously noted, the photosensitive element is exposed within the housing of a camera or other apparatus and is thereafter superposed with the second element and the two elements are moved, commencing in the region of their leading ends, between a pair of pressure-applying members for first rupturing the container located between the elements and then for spreading the fluid contents of the container in a layer therebetween to form a sandwich. As this sandwich comprising the photosensitive and second sheets and a layer of fluid processing agent is formed, it is removed from the camera or apparatus directly into the light. Accordingly, provision must be made for preventing exposure of the photosensitive layer of the photosensitive sheet. This may be accomplished, for example, by providing the supports for photosensitive sheet 16 and second sheet 22 with a layer of material or with a coating of a material which is opaque to actinic light. As the fluid processing agent is distributed between the two sheets, it functions as an adhesive for holding the photosensitive and print-receiving sheets in superposition. Prevention of the exposure of the photosensitive sheet by light entering between the margins of the sheets can be further assured by providing a light-absorbing dye or pigment in the fluid processing agent.

The photosensitive and second elements of film assemblage 10 are secured to one another to form a single unit which, along with one or more other units, may comprise a film assemblage. The second element of the film unit is adapted to be positioned apart from the photosensitive element during exposure of the latter and the film unit, following exposure, is processed by being withdrawn between a pair of pressure-applying members from the apparatus, usually a camera, in which the photosensitive element is exposed. The film units, when they comprise an assemblage, are arranged with the photosensitive elements in stacked relation and the second elements in stacked relation. The photosensitive and print-receiving layers of the photosensitive and second sheets are disposed innermost and it is the innermost film unit which is intended to be exposed and processed first with the photosensitive and second sheets of subsequent film units being arranged outwardly from the first film unit.

Each film unit comprises leader means whereby it may be withdrawn from the assemblage of film units between a pair of pressure-applying members and from the apparatus in which it was exposed. Accordingly, means must be provided for securing the photosensitive and second elements of each film unit together in such a manner that they can be withdrawn singly and in proper sequence from the assemblage between a pair of pressure-applying members and from the apparatus and yet in such a manner that the photosensitive and second sheets can be positioned apart during exposure, the photosensitive and second sheets are registered with one another when they are superposed and the inner photosensitive and second elements comprising a film unit can be withdrawn from the assemblage between the photosensitive and second sheets of subsequent film units. The photosensitive element 12 and second element 14 of each film unit are secured together adjacent the leading ends of photosensitive sheet 16 and second sheet 22 at lateral portions 21 and flanges 26. For this purpose there is provided a pair of connecting strips, designated 36, secured near the leading ends of photosensitive sheet 16 and second sheet 22 to the outer surfaces of leader sheet 20 and leading end section 28. Connecting strips 36 may comprise paper, fabric or plastic material coated with an adhesive, cellophane tape and "Mylar" tape being particularly suited for this purpose by virtue of their strength and resistance to tearing.

Connecting strips 36 include end portions secured to leader sheet 20 and leading end section 28 and intermediate connecting portions 38 which extend therebetween. Lateral portions 21 and flanges 26 cooperate with the connecting strips in several ways to facilitate withdrawal of the film units from the assemblage. They adhere to the adhesive on the connecting strips at connecting portions 38 to provide means for strengthening the strips at these portions and for preventing the adhesive for adhering to another film unit so as to resist withdrawal of the film units, one at a time, from the assemblage. Lateral portions 21 and flanges 26, by virtue of their tapered or divergent edges, cause connecting portions 38 to be spaced outward slightly from, and at an angle with respect to, the edges of the photosensitive and second sheets and thereby facilitate assembling of the assemblage of film units and withdrawal of each film unit from the assemblage between the connecting strips of succeeding film units, one at a time and in proper sequence.

In other forms of film units, lateral portions 21 and/or flanges 26 may themselves comprise the connecting strips. Alternatively, leader sheet 20 may be entirely eliminated, photosensitive sheet 16 may be longer and lateral portions 21 may comprise the photosensitive sheet itself.

Photographic apparatus in the form of a camera, typical of the type with which the film units of the invention and an assemblage of said film units are adapted to be employed, is illustrated diagrammatically in FIG. 5 of the drawings along with an assemblage of film units shown housed in the camera. Basically, the camera may be a folding-type camera wherein the lens and shutter assembly is mounted for movement relative to the means defining the focal plane for mounting the photosensitive material for exposure, or it may be a rigid, non-folding camera such as illustrated in FIG. 5. This camera, designated 40, comprises a housing on which is mounted a conventional lens and shutter assembly 42. The housing includes a rear wall 44 and an inner rear wall 46 cooperating to define a rear chamber 48 in which the photosensitive elements are housed and positioned for exposure. Inner rear wall 46 is shorter than rear wall 44, has its rear surface substantially at the focal surface of the lens of assembly 42 and is provided with an exposure aperture 50 through which light can be transmitted for exposing photosensitive sheets located within chamber 48. A spring and pressure plate assembly 52 is provided in rear chamber 48 for urging the photosensitive elements located therein forward into position for exposure against the rear surface of inner rear wall 46 across aperture 50. The camera housing includes a lower wall 54 and an inner lower wall 56, both extending forward at an angle with respect to rear wall 44 and inner rear wall 46 and cooperating to define a second chamber 58 adapted to contain print-receiving elements 14. The descriptive terms "upper" and "lower" are used herein solely for the purpose of convenience of description and not in a limiting sense. The camera is described as it appears in the drawings and not necessarily in the position that it would be employed, so that lower wall 54, for example, might just as well be described as a side wall.

Inner rear wall 46 and inner lower wall 56 are joined at their lower and rear ends, respectively, so that chambers 48 and 58 communicate with one another. The housing includes a lower section comprising the lower portion of rear wall 44 and a forward wall 60 extending downwardly from lower wall 54. This lower section provides a passage 62 communicating with chambers 48 and 58 and having an opening or slot 64 in its lower end. A pair of pressure-applying members in the form of elongated rolls 66 and 68 are mounted in juxtaposition in passage 62 adjacent opening 64. This opening preferably comprises an elongated slot just long enough to allow the passage of the film unit and just sufficiently wide to admit a film unit and a plurality of leader sheets. Slot 64 is preferably narrower than the aggregate thickness, i.e., the sum of the diameters, of the pressure-applying rolls so that the rolls block the slot against the admission of light. To permit loading of an assemblage of film units into the camera, the camera housing may comprise two relatively movable sections, one of which, in the form shown, comprises rear wall 44 and is pivoted at its upper end on a pivot or hinge means 70.

Heretofore, in cameras of the present type adapted to be employed with film units having individual leaders which must be threaded between the pressure-applying members, means were required for mounting the pressure-applying members so that they could be spaced apart to permit threading of the leaders therebetween, either during the loading operation or following exposure of each individual film unit, so that it can be processed. The film unit of the invention makes possible a camera wherein the pressure-applying rolls are part of a single unit and need not be spaced apart for loading or threading of leaders therebetween. In the camera shown, both pressure-applying rolls 66 and 68 are mounted together on the pivotable rear section of the camera so that, when the camera is opened, the rolls are displaced from wall 60, allowing a leader to be threaded between roll 68 and wall 60, rather than between the rolls.

A film unit construction which makes possible this novel camera construction is what amounts to a pair of leaders for each film unit. A stiffener sheet 72 of a comparatively inflexible material is secured to leading end section 28 to form, in conjunction therewith, a first leader 74 adapted to be drawn between the pressure-applying rolls and thereby provide means for drawing the film unit between the rolls. The other or second leader, designated 76, is secured to leading end section 28 of first leader 74 adjacent the leading end of second sheet 22 and is relatively flexible and substantially longer than first leader 74. Second leader 76 is adapted to extend through passage 62 between the roll 68 and forward wall 60 and project from the camera through slot 64 so that it can be manually grasped, while the leader comprising leading end section 28 and stiffener sheet 72 remains within passage 62 with its leading end located adjacent the nip of the rolls. Flexible leader 76 can be grasped and pulled for drawing or projecting the leading end of inflexible leader 74 between the pressure-applying rolls until leader 74 extends from the camera so that it can be grasped for withdrawing a film unit from the camera between the rolls.

Guide means are provided for insuring that inflexible leaders 74 go between the rolls and, in the form shown, comprise inflexible guide members 78 and 80 secured, respectively, to rear wall 44 and forward wall 60 within passage 62. Guide members 78 anad 80 project downwardly and inwardly toward the nip of the rolls. A guide roll 82 is provided mounted with their axes substantially in a plane on forward wall 60 adjacent pressure-applying roll 68 so that the second leaders are guided between roll 82 and roll 68 and around the latter along a tortuous path through opening 64. This arrangement not only insures that the second leaders are guided between the rolls but facilitates light-sealing of passage 62. Pressure-applying rolls 66 and 68 block the entrance of light into passage 62 through opening 64 and do not have to be spread apart to permit threading of the leaders therebetween, while the second leaders extend around one pressure-applying roll rather than between the pressure-applying roll along a path which precludes the entrance of light. Except during actual withdrawal of a film unit between the pressure-applying rolls, no part of any film unit extends between the rolls, but the leaders extend around one pressure-applying roll and through slot 64.

Since the function of second leader 76 is to cause first leader 74 to project between the pressure-applying rolls so that the film unit can be drawn therebetween, it becomes necessary to detach the first leader from the film unit after it has performed this function. To this end second leader 76 is provided with a relatively narrow, necked-down section 84 at its trailing end. It is at this necked-down section 84 that the second leader is secured to leading end section 28. The necked-down section, being substantially narrower than the remainder of second leader 76, is weaker and hence adapted to tear when the first leader has been drawn between the pressure-applying members. In an alternative embodiment, the second leader may be secured to the first leader by a strippable adhesive, or one which forms a bond that can be broken. Second leader 76 need be only sufficiently long enough to project from the camera so that it may be grasped. When a plurality of film units are assembled together to form the film assemblage of the invention, the second leaders may be of different lengths so as to indicate the sequence in which the film units should be withdrawn. For example, the leader of the first film unit would be the longest and the leaders of each succeeding film unit would be shorter than that of the preceding film unit so that the operator need only grasp the longest leader which, incidentally, would be the easiest to grasp.

Figure 3:
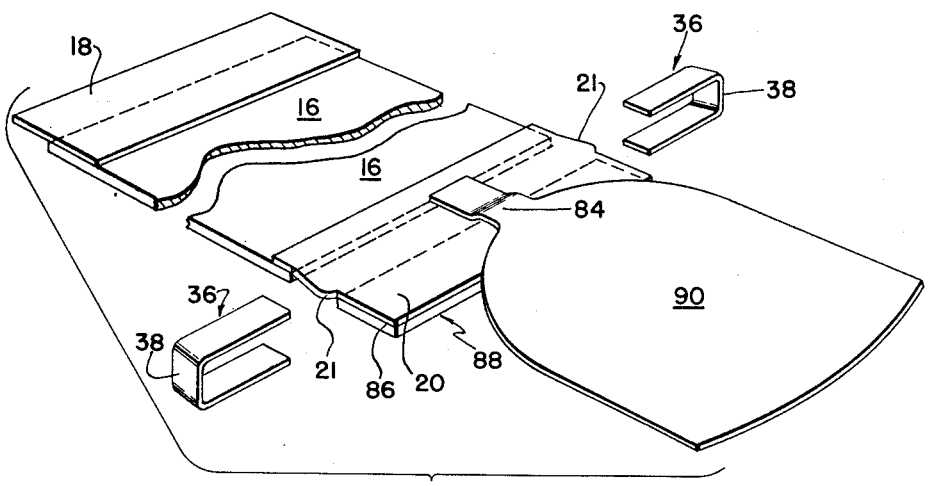
FIG. 3 is a fragmentary, exploded, perspective view of components of another form of film unit embodying the invention.

In the embodiment of the film unit described heretofore, both the first and second leaders are attached to print-receiving element 14 with the result that the second leaders are stacked forwardly of the foremost first leader toward the front of the camera and are required to extend between pressure-applying roll 68 and forward wall 60 of the camera. In another embodiment of the film unit shown in FIGS. 3 and 4, the leaders are attached to the photosensitive element 12 with the result that in the camera the second leaders can extend between the rearmost pressure-applying roll 66 and rear wall 44.

This last-mentioned embodiment of the film unit may be substantially the same as film unit 10 except insofar as the leader arrangement is concerned. Leader sheet 20 is longer than leading end section 28, the latter being of sufficient length to mount a container 32 of the fluid processing agent and to permit attachment of connecting strips 36 thereto. A stiffening sheet 86 is secured to the leading end of leader sheet 20 to form a first leader, designated 88, and a second leader 90 is secured to leader sheet 20 adjacent the leading edge of the photosensitive sheet.

A camera adapted to use with this last-mentioned embodiment of the film unit may be, for the most part, the same as camera 40 adapted for use with film unit 10. This embodiment of the camera, shown in FIG. 6 differs in that guide roll 82 is mounted on the rear section of the camera for movement along with rear wall 44 while the pressure-applying rolls are mounted on the other or forward section of the camera. This arrangement permits rear wall 44 and guide roll 82 to be displaced from pressure-applying roll 66 so that the assembly of film units may be loaded into the camera with second leaders 90 extending between rear wall 44 and guide roll 82 and pressure-applying roll 66. Operation of the two embodiments of the camera is substantially the same.

As a film unit is withdrawn from an assemblage of film units, frictional forces are generated between it and elements, particularly the photosensitive elements, of succeeding film units, tending to move the succeeding film units as well. Accordingly, means are provided for retaining the film units stationary as one of them is withdrawn, and, in the form shown, comprise a backing element 92 for the stack of photosensitive elements 12 to which are secured trailer sheets 18. Another backing element (not shown) may be provided for second elements 14 and trailing end sections 30 thereof may be secured to this last-mentioned backing element. In the interests of compactness, trailer sheets 18 extend around the trailing end of backing element 92 and are secured to its rear or outer surface, preferably in such a manner that they can be released readily. For example, the trailer sheets may be secured closely adjacent their trailing edges by a staple or other means which will tear out readily. The backing element is in turn adapted to be retained in the camera by suitable means provided for this purpose. Other arrangements may be made for retaining the film units in the apparatus during withdrawal of a film unit from the assemblage and apparatus and may be employed in combination with the film unit described herein.

It is desirable, in order to insure complete spread of the fluid processing agent in a layer of desired thickness over the area of the photosensitive and second sheets defined by aperture 25, to provide the fluid processing agent in an amount which is greater than that required. It becomes important, therefore, to collect or trap any excess fluid which may be squeezed from between the trailing ends of the photosensitive and second sheets so that this excess fluid does not collect on the pressure-applying rolls. It is in this connection that trailer sheet 18 and trailing end section 30 cooperate to perform still another function. The sheet materials comprising trailer sheet 18 and trailing end section 30 are substantially thinner in aggregate than the combined thickness of the photosensitive and second elements in the region of the second sheet. By virtue of this construction, the pressure-applying rolls can be constructed so as to have a minimum gap width which approximates the thickness of the combined photosensitive and second elements, whereby a space is provided between trailer sheet 18 and trailing end section 30 as they are moved between the pressure-applying members. It is in this space between the trailer sheet and the trailing end section that any excess processing fluid is trapped and retained. The portions of the intermediate section of carrier sheet 24 bordering aperture 25 and secured to print-receiving sheet 22 function as a mask during spreading of the fluid and aid in controlling the thickness of the layer of fluid and the area of contact between the fluid and the print-receiving sheet whereby a border is formed on the transfer print produced on sheet 22.

A container in the form of envelopes is provided for enclosing the film units of the assemblage to hold them together and prevent exposure of the photosensitive sheets. In the form shown, this container comprises a first envelope 94 for the stack of photosensitive elements 12 and a second envelope 96 for the stack of second elements 14. The inner walls of the envelopes, that is, walls designated 98 and 100 and located closest one another, are secured together adjacent the open ends of the envelope. Inner wall 98 of envelope 94 is provided with an exposure aperture 102 through which photosensitive sheets in the envelope can be exposed. A dark slide 104 is provided in envelope 94 across aperture 102 between inner wall 98 and the first photosensitive sheet for preventing light from entering the aperture and exposing the photosensitive sheets. Dark slide 104 is preferably formed of a sheet material such as paper which is opaque to actinic light. The dark slide includes a leader 106 comprising the leading end portion of the dark slide.

The entire assemblage, including the envelopes, photosensitive and print-receiving elements and dark slide, is loaded into the camera with first envelope 94, containing the photosensitive element, located in rear chamber 48, second envelope 96, containing the print-receiving elements, located in chamber 58 and the second leaders attached to the film units and leader 106 of the dark slide extending from the camera either in front of or behind the pressure-applying rolls. After the camera is closed, leader 106 attached to the dark slide 104 is withdrawn from the camera, drawing the dark slide from the camera. The first film unit is then ready for exposure, and, following exposure, the second leader attached thereto is pulled from the camera and the first leader is then grasped for withdrawing the entire film unit between the pressure-applying rolls.

Other modifications may be made in the construction of the film assemblage of the invention and are deemed to fall within the scope thereof. These modifications include changes in the means for trapping the excess processing fluid and may include, for example, folding the trailing end portion of the carrier sheet back upon itself and securing it together at its lateral margins to form an envelope, open toward the leading end of the film unit, in which the excess fluid can collect. Other departures from the structure shown may include changes in the container or outer envelope of the assemblage, the dark slide arrangement and the means for retaining the film units stationary within the container during withdrawal of a film unit.

The double leader arrangement of the present invention, that is, the arrangement of an elongated second leader adapted to extend to one side of the pressure-applying members for drawing a shorter and first leader between the pressure-applying members, finds utility in other forms of film assemblages, for example in a film assemblage such as is shown and described in copending U.S. application Serial No. 696,505, filed November 14, 1957 in the name of William H. Eburn, Jr., now Patent No. 2,909,977, issued October 27, 1959. In that assemblage, each film unit includes a leader attached to the trailing end of the preceding film unit with the leader of the first film unit attached to the dark slide. However, the dark slide or a leader attached thereto must be threaded between the pressure-applying rolls initially during loading. By providing the double leader arrangement as a part of the dark slide of this type of film assemblage, the necessity for spacing apart the pressure-applying rolls and of providing structure for doing so could be eliminated.

Since certain changes may be made in the above apparatus and product without departing from the scope of the invention herein involved, it is intended that all matter contained in the above description or shown in the accompanying drawings shall be interpreted as illustrative and not in a limiting sense.

What is claimed is:

1. A photographic film assemblage including a plurality of individual film units for use in photographic apparatus in which said film units are exposed and withdrawn in succession between a pair of juxtaposed pressure-applying members, said film assemblage comprising, in combination:

a container having an opening therein;

a plurality of individual film units each comprising a photosensitive sheet positioned for exposure within said container, a second sheet arranged for superposition with said photosensitive sheet, means including a first leader coupled with said sheets for drawing said sheets in superposition between said pressure-applying members and a second leader coupled with said first leader at a location thereon spaced from the leading edge of said first leader toward the trailing ends of said each film unit for drawing said first leader between said pressure-applying members in response to withdrawal movement of said second leader past and to one side of said pressure-applying members;

said film units being arranged in said container with said leading end of said first leaders located generally in alignment, said opening being dimensioned to permit withdrawal of said film units one at a time from said container;

said second leaders extending in overlying relation through said opening a substantial distance beyond said leading ends of said first leaders so as to project from said apparatus past and to one side of said pressure-applying members when said first leaders are disposed within said apparatus to the inside of said pressure-applying members.

2. The photographic film assemblage of claim 1 in which said second leaders are detachably coupled with said first leaders.

3. The photographic film assemblage of claim 2 in which each of said second leaders is detachably coupled with one of said first leaders by an adhesive.

4. The photographic film assemblage of claim 1 in which each of said second leaders includes a section which is substantially narrower than said first leader.

5. The photographic film assemblage of claim 4 in which each of said second leaders is attached to one said first leaders at said narrower section of said each second leader substantially midway between the sides of said one first leader.

6. The photographic film assemblage of claim 1 in which each of said first leaders is less flexible than said second leader coupled therewith.

7. The photographic film assemblage of claim 1 in which each of said second leaders is so coupled with one of said first leaders as to become detached therefrom at said first leader.

8. A photographic film assemblage including a plurality of individual film units for use in photographic apparatus in which said film units are exposed and withdrawn in succession between a pair of juxtaposed pressure-applying members, said film assemblage comprising, in combination:

a container having an opening therein;

a plurality of individual film units each comprising a photosensitive sheet positioned for exposure within said container, a second sheet arranged for superposition with said photosensitive sheet, means including a first leader coupled with the leading ends of said photosensitive and second sheets for superposing said sheets and drawing said sheets into superposition between said pressure-applying members and a second leader coupled with said first leader at the location thereon intermediate the leading end of said first leader and said leading ends of said sheets for drawing said first leader between said pressure-applying member in response to withdrawal movement of said second leader from said apparatus past and to one side of said pressure-applying members;

said film units being arranged in said container with said leading ends of said first leaders located in overlying relation and in substantial alignment, said opening being dimensioned to permit withdrawal of said film units from said container;

said second leaders extending in overlying relation through said opening a substantial distance beyond said leading ends of said first leaders so as to project from said apparatus past said pressure-applying members when said first leaders are disposed within said apparatus to the inside of said pressure-applying members.

9. The film assemblage of claim 7 in which said second leaders are detachably coupled with said first leaders.

10. The photographic film assemblage claim 8 in which each of said second leaders includes a section which is substantially narrower than said first leader coupled therewith, and is coupled with said first leader at said section.

11. The photographic film assemblage of claim 10 in which each of said second leaders is secured to said first leader by a strippable adhesive.

12. The photographic film assemblage of claim 10 in which said second leaders are coupled with said first leaders substantially midway between the sides thereof.

No references cited.